(No Model.)  6 Sheets—Sheet 2.

N. TROYER.
CAN SOLDERING MACHINE.

No. 571,627.  Patented Nov. 17, 1896.

WITNESSES:  INVENTOR
  N. Troyer
  ATTORNEYS.

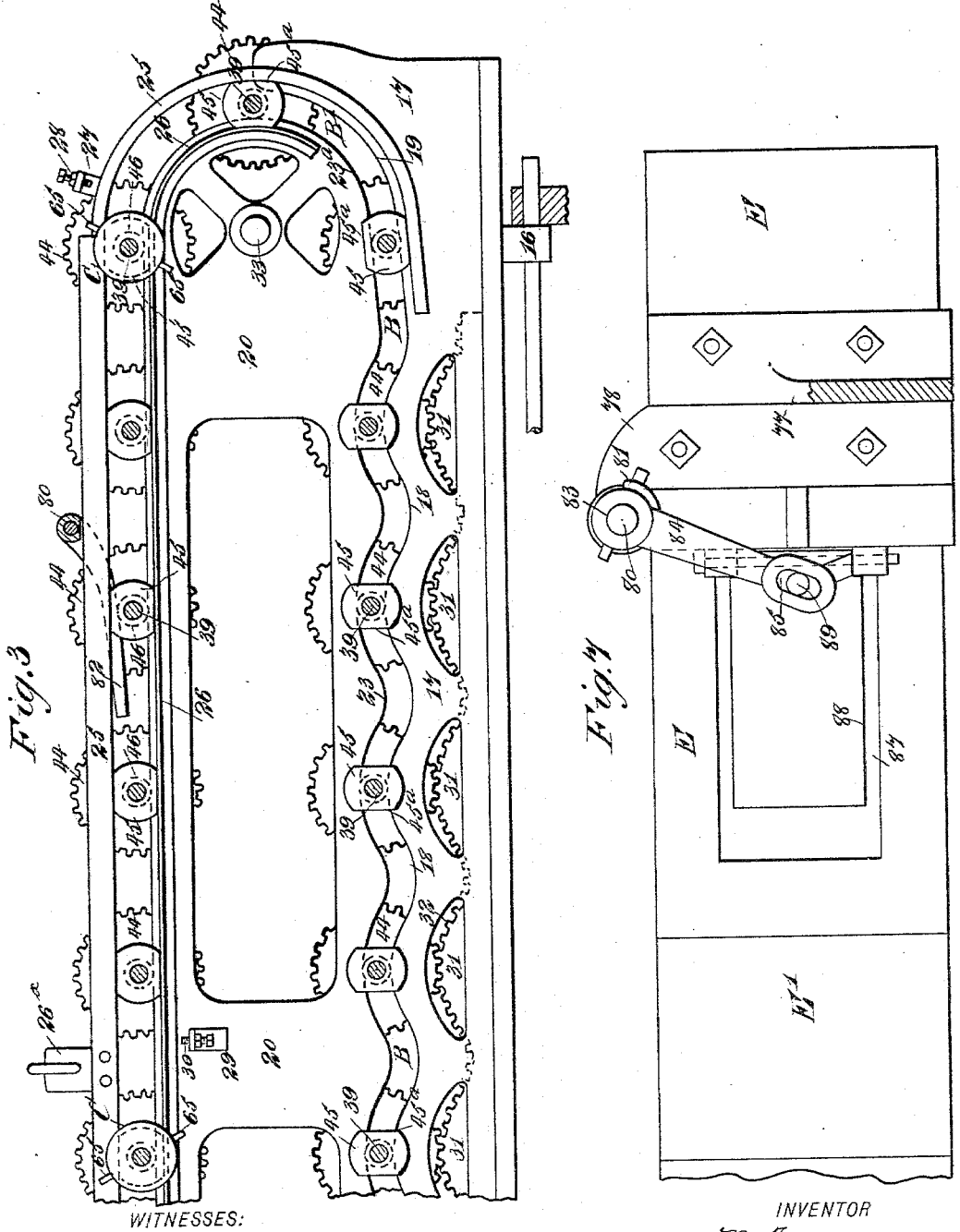

(No Model.)  6 Sheets—Sheet 4.
N. TROYER.
CAN SOLDERING MACHINE.
No. 571,627.  Patented Nov. 17, 1896.
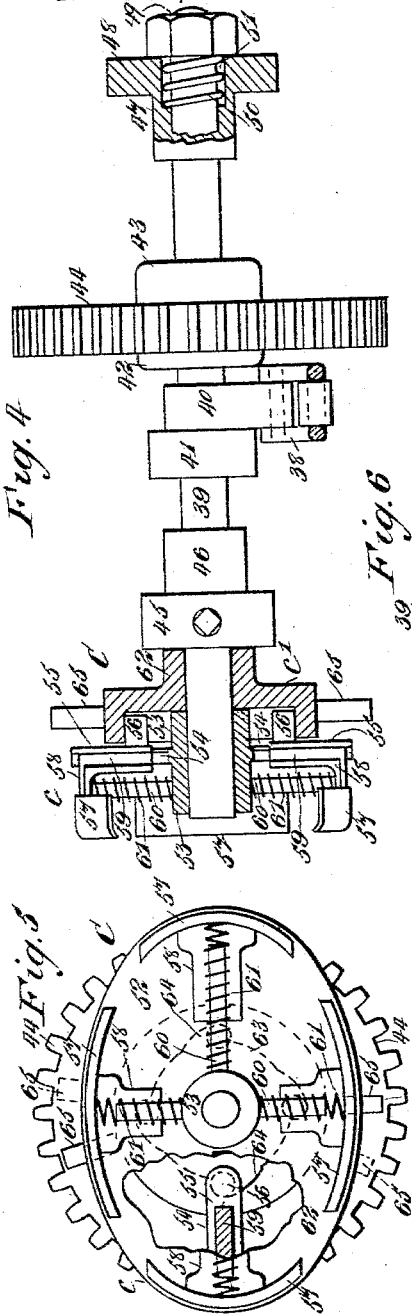
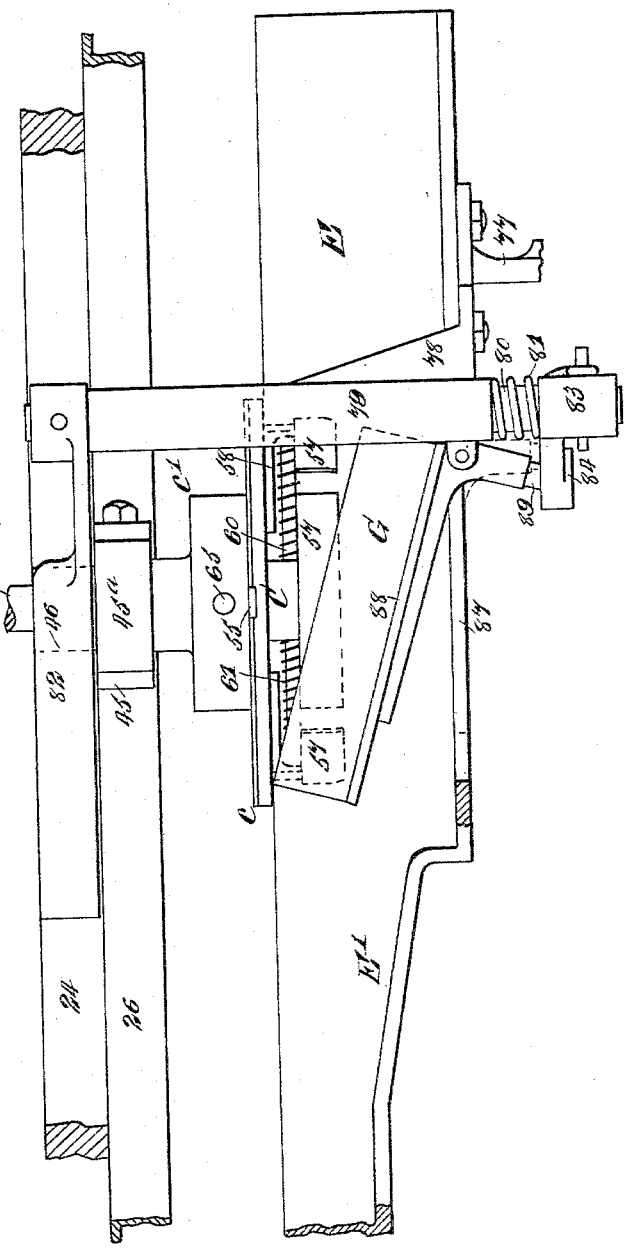
WITNESSES:
Donn Twitchell
J. Fed Acker
INVENTOR
N. Troyer
BY
Munn & Co
ATTORNEYS.

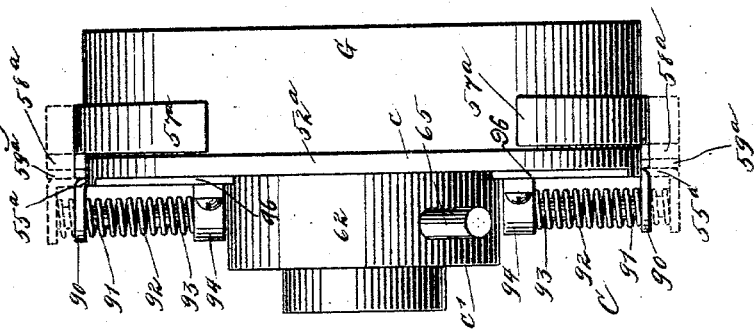

(No Model.) 6 Sheets—Sheet 6.

N. TROYER.
CAN SOLDERING MACHINE.

No. 571,627. Patented Nov. 17, 1896.

WITNESSES:
Edward Thorpe

INVENTOR
N. Troyer
BY
ATTORNEYS.

UNITED STATES PATENT OFFICE.

NELSON TROYER, OF ASTORIA, OREGON, ASSIGNOR OF ONE-HALF TO FREDERICK P. KENDALL, OF SAME PLACE.

CAN-SOLDERING MACHINE.

SPECIFICATION forming part of Letters Patent No. 571,627, dated November 17, 1896.

Application filed September 23, 1895. Serial No. 563,401. (No model.)

*To all whom it may concern:*

Be it known that I, NELSON TROYER, of Astoria, in the county of Clatsop and State of Oregon, have invented a new and Improved Can-Soldering Machine, of which the following is a full, clear, and exact description.

My invention relates to a machine for soldering cans, being especially designed for soldering the ends of elliptical or oval sheet-metal cans.

The object of the invention is to provide a simple and economic machine in which when the cans with their parts properly assembled are placed in a hopper they will be automatically fed to and secured upon chucks, the chucks being connected with an endless carrier.

Another object of the invention is to provide means for automatically conveying the cans to a suitable flux and turning the cans thereon so as to present the entire edge to the flux, whereupon the cans are raised and carried to a receptacle containing molten solder, being manipulated in the solder in the same manner as in the flux, and finally the soldered cans are automatically released from the chucks and discharged from the machine.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
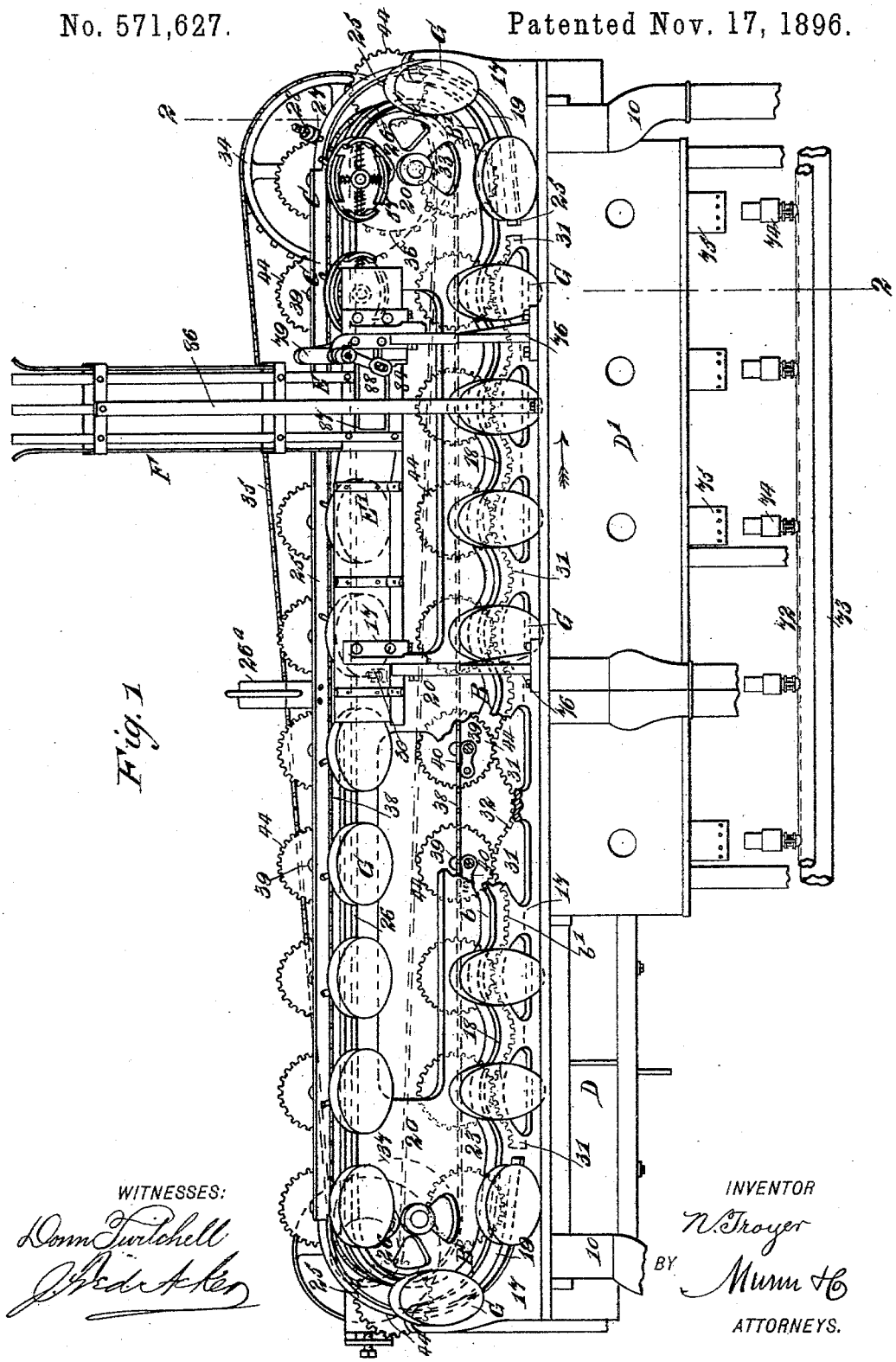
Figure 2:
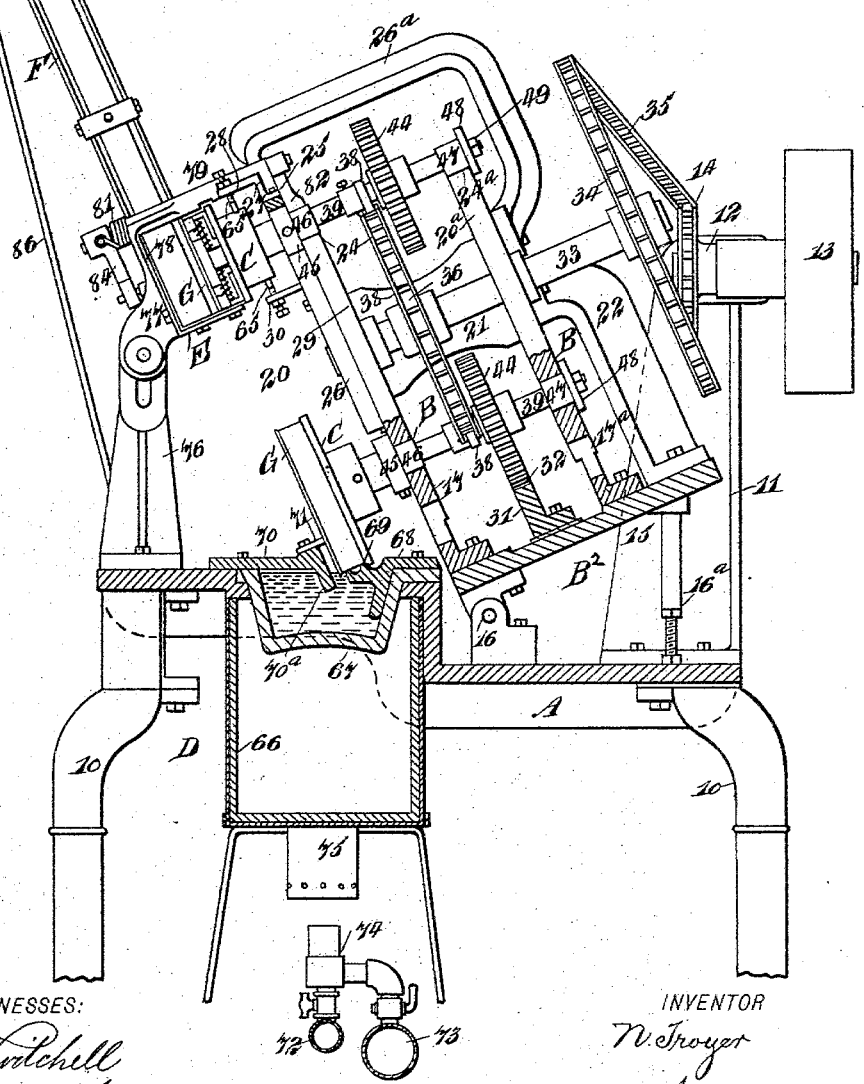
Figure 10:
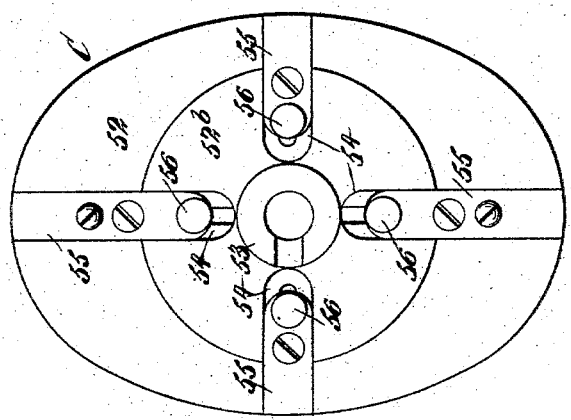
Figure 11:
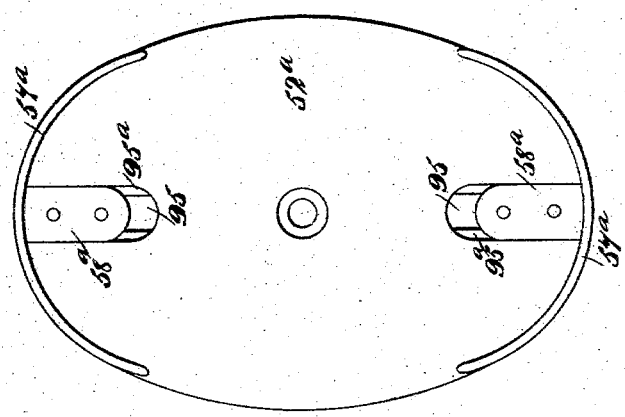
Figure 12:
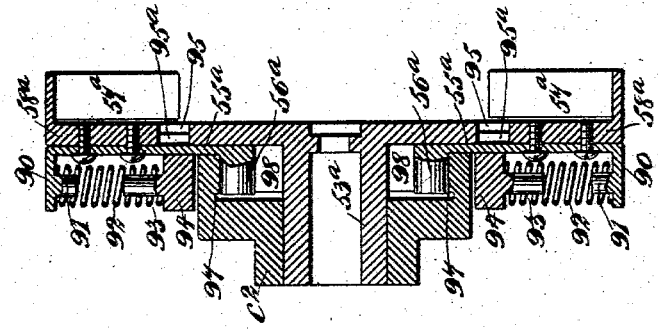

Figure 1 is a front elevation of the improved machine, parts being broken away. Fig. 2 is a partial end view and partial vertical section, the section being taken substantially on the line 2 2 of Fig. 1. Fig. 3 is a partial front elevation of the main frame of the machine and sundry of the parts carried thereby. Fig. 4 is a sectional view of one of the chucks adapted for empty cans, together with its carrying-shaft and the parts located upon the said shaft, a portion of the parts being in section. Fig. 5 is a front elevation of the chuck and attaching mechanism shown in Fig. 4, a portion of said chuck being in section. Fig. 6 is a plan view of the can-feed. Fig. 7 is a side elevation of the same. Fig. 8 is a plan view of the holder or chuck adapted for filled cans. Fig. 9 is a side elevation of the same. Fig. 10 is a rear view of the chuck adapted for empty cans, also shown in Figs. 4 and 5, the cam-head having been removed. Fig. 11 is a front elevation of the chuck employed for filled cans, and Fig. 12 is a longitudinal section through the central portion of the chuck shown in Fig. 11.

In carrying out the invention a bed or main frame A is employed supported by suitable legs 10, as best shown in Fig. 2. The auxiliary frame $B^2$ of the machine is located on the bed, and this auxiliary frame consists, primarily, of a bottom 15, and the said bottom has a hinged connection 16 at its forward edge with the bed or main frame A, as is best shown in Fig. 2, and the inclination of the auxiliary frame may be varied by means of an adjusting-screw $16^a$, carried by the bed and engaging with the frame or vice versa.

In addition to the bottom 15 a longitudinal front plate 17 is secured to the upper face of the bottom at its forward edge, and the upper edge of this front plate is made undulating, as shown at 18 in Figs. 1 and 3. The undulation, however, stops near the ends of the said front plate, where its upper surface is concaved, being given a gradual upward curve, as shown at 19 in Figs. 1 and 3. The front plate at its ends is carried upward to about the central portion of the machine, as is particularly shown in the said Figs. 1 and 3, in order that the curved surface 17 may extend to the aforesaid central point. The front plate 17 is duplicated at the back, and the back plate is designated as $17^a$, being shown in section in Fig. 2.

An upper front plate 20 is located above the lower front plate 17, being a predetermined distance therefrom, and this front plate is duplicated at the back, the back plate being designated as $20^a$, as shown in Fig. 2. These two plates are supported, preferably, by a web 21, about centrally placed and connecting the said plates, as is likewise shown in Fig. 2, the web, together with the back upper plate $20^a$, being supported by one or more standards 22, secured to the rear portion of the bottom of the auxiliary frame. The plates 17, 17², 20, and 20ª form an endless oval-shaped guide carried on the auxiliary frame.

The under edge of the front and rear upper plates 20 and 20ª are made to correspond to the upper edges of the front and rear lower plates 17 and 17ª; that is to say, the lower edges of the front and rear upper plates are made undulating in the same manner as the lower plates, thereby forming between these plates a serpentine guideway or channel B. The ends of both the front and the rear upper plates 20 and 20ª are convexed, the curvature thereof corresponding to the curvature at the points 19 on the front and rear lower plates 17 and 17ª, producing at these points a guideway or channel B' of continuous curvature. The upper edges of both the front and rear upper plates 20 and 20ª are preferably made straight and flat, forming thereby tracks 24 and 24ª, as shown in Fig. 2.

A guide-rail 25 is located a predetermined distance from the upper edge of the front upper plate 20 and in advance of said plate, being out of its vertical plane. The guide-rail is supported, preferably, at the center by a bracket 26ª, which extends over the top of the machine and is secured to the rear upper plate 20ª or to any other convenient support. The upper guide-rail 25 is curved at its ends to follow the curvature of the end channels or guideways B' near the outer walls of the latter, as shown in Figs. 1 and 3, and the said guide-rail is of sufficient length to extend slightly below the lower end of this channel. A second guide-rail 26 is formed upon the front upper portion of the front upper plate 20 of the frame, being parallel with the upper guide-rail 25 at the top of the frame and concentric at its ends with the curved end portions of the said upper guide-rail. The lower guide-rail 26, however, is shorter than the upper one 25, terminating at or near the center of the curved ends of the upper guide-rail 25, but the extremities of the lower guide-rail 26 are carried a certain distance downward near the inner side wall of the channel B', as is best shown in Fig. 3.

At or near the point where the upper guide-rail 25 commences to curve at the forward end of the machine a forwardly-extending bracket 27 is erected thereon, carrying an adjustable trip-stud 28, and a similar bracket 29 is secured upon the front face of the upper front plate 20 of the frame at a point near its center and near the lower guide-rail 26, and this latter bracket is provided with an adjustable trip-stud 30, the trip-stud 28 extending downwardly and the trip-stud 30 in an upwardly direction.

Between the front and rear plates 17 and 17ª a rack 31 is located, being secured to the bottom 15 of the frame; and the upper toothed surface 32 of this rack is undulating, following the undulations in the guide-channel B', heretofore described, and the rack terminates at the point where the gradually-curved end channels B' meet the undulating channel B, as is clearly shown in Fig. 3 and likewise in Fig. 1.

Near the forward end of the machine a shaft 33 is journaled in the front and rear upper plates 20 and 20ª, and this shaft carries at its rear end a large sprocket-wheel 34, connected, preferably, by a link-belt 35 with a smaller sprocket-wheel 14, secured upon a drive-shaft 12, journaled in suitable bearings located upon the upright 11 at the rear end of the machine, the said shaft 12 being provided with a driving-pulley 13.

Between the plates 20 and 20ª of the main frame a sprocket-wheel 36 of predetermined diameter is secured upon the driving-shaft 33 of the machine, a similar wheel 37 being journaled in the said plates 20 and 20ª of the frame at its rear end, as shown in Fig. 1, and an endless carrying-belt, preferably a link-belt 38, extends from one of the said sprocket-wheels to the other.

The endless carrying-belt 38 is adapted to have attached thereto a predetermined number of chucks C, and each chuck is adapted to receive and to carry a can to be soldered. Each chuck is mounted upon the forward end of a shaft 39, as shown in Fig. 4, and each shaft 39 is made to pass through one end of a link 40, the other end of the link being attached to the aforesaid carrying-chain, as shown in Figs. 1 and 4. The link 40, attached to the shaft, is prevented from sliding thereon by a collar 41, placed at one side of it, and a collar 42 near the opposite side, and between the collar 42 and a third collar 43 a gear-wheel 44 is secured upon each chuck-shaft 39, the said gears being adapted to engage with and travel upon the toothed surface of the undulating rack 31.

A guide-block 45 is secured upon each chuck-shaft 39 just back of the chuck C, and, as shown in Fig. 3, the guide-block 45 is provided with two opposing flat surfaces 45ª, and these flat surfaces of the guide-plates are adapted to travel between the upper and lower guideways 25 and 26 and prevent the chuck-shaft from turning during the length of the said rails, as shown in Fig. 3, and preferably integral with each of the guide-blocks 45 a cylindrical or roller extension 46 is formed, being adapted to travel upon the upper or track surface 24 of the upper front plate 20 of the machine-frame, as illustrated in Fig. 2.

At the rear end of each chuck-shaft 39 a cylindrical block 47 is secured on the shaft, being capable of limited end movement, and a flange 48 is formed at the outer end of the cylindrical block, which block is virtually a roller, and a nut 49, screwed upon the rear end of the shaft, holds the cylindrical block in place. A spring 50 is made to encircle the rear end of the chuck-shaft, being contained within a recess 51, produced in the aforesaid cylindrical block, as illustrated in Fig. 4.

The rear roller-surface 47 is adapted to travel upon the upper track-surface 24ª of the rear upper plate 20ª of the machine, the flange 48 engaging with the rear side of this plate. Thus it will be observed that the chuck-shaft will be prevented from slipping from the machine-frame, which it would be inclined to do, if not prevented, owing to the inclination of the frame, since the rear flanges 48 of the shafts act upon the rear upper plate 20ª at the back, and the guide-blocks 45 act upon the front face of the forward upper plates 20ʰ. Thus the shaft is virtually tied to the frame, yet is free to travel thereon, and the spring 50 permits the shaft to accommodate itself to any irregularities in the frame.

The chuck C consists of a body c and a cam-head c'. The said body comprises a plate 52, usually made with a slide-piece 52ª upon the central portion of its outer face, which plate is shaped to the form of the can G, being ordinarily elliptical; and the plate is provided with a hub 53, extending beyond both of its faces. The said plate is likewise provided with, preferably four, radial slots 54, equidistant apart, being one at each end and one at each side of the plate, and the upper face of the plate at the margin of these slots is countersunk in order to receive a slide 55, and each of these slides has a stud or pin 56 formed upon the outer face of its inner end. Each slide is adapted to manipulate a segmental clamp 57. The clamps are upon the outer face of the plate 52 at its margin, being four in number, and conform to the marginal contour of the plate. Each clamp has a shank 58, preferably of angular construction, secured to it, and the horizontal member of each shank is held to slide longitudinally of the slot 54 in the body-plate 52, located over the shank, and each shank is connected with the slide above it by means of a web 59, as shown in Fig. 5, which webs extend through the slots 54. The clamps are normally forced outward through the medium of springs 61, secured one to the central portion of the inner face of each clamp, and these springs receive guide-bars 60, projected from the hub of the body, as is clearly shown in both Figs. 4 and 5.

The cam-head c' comprises a casting 62, which is loosely mounted on the chuck-shaft 39, and the aforesaid casting or head is provided with a four-faced cam-surface upon its outer face or that face opposed to the body of the chuck. The cam-surface 63 is sunken in order to receive the studs or pins 56 of the slides 55, and a rest 64 is at the terminal of each of the four faces, as shown in dotted lines in Fig. 5. The cam-head is further provided with two pins 65, projected from its outer peripheral surface, and the pins are approximately opposite one another. The pins are adapted for engagement with the trip-studs 28 and 30, and when the pins of the cam-head engage with the upper trip-stud 28 the said head is turned in a manner to draw the slides inward and consequently the clamps 57, and since in this form of chuck the clamps are to enter the can, the can will then be freed from engagement with the clamps and will be released; whereas the trip-stud 30 is located at the rear of the hopper and the feed mechanism, and when the pins of the cam-head are engaged by this lower trip-stud the movement of the cam-head will be reversed and the clamps will be free to expand or be carried outward to clamp a can.

The form of chuck just described, as heretofore stated, is adapted to enter a can, and consequently but one end is soldered. If the can is filled and the other end is to be soldered on, then the only difference in the form of chuck would be that the clamps 57 will engage with the outer surface of the can instead of its inner surface.

Near the rear end of the machine, on the front, a box or receptacle D is supported, being preferably inserted in the base-plate A in advance of the frame of the machine, and the said box is adapted to contain a flux of any desired character. This flux box or receptacle is immediately below the bottom of the rear end of the upper guide-rail 25.

Immediately adjoining the flux receptacle D a furnace D' is attached to or secured upon the base A, the furnace being shown in both Figs. 1 and 2. This furnace is preferably given a lining of asbestos or other fireproof material (designated as 66) and in which is introduced a pan or trough in which the molten solder is to be contained. A rest-plate 68 is secured to the rear portion of the said solder-trough 67, as shown in Fig. 2, and the said rest-plate is provided with a bearing-surface extending preferably within the trough and practically within the solder, and this bearing 69 is provided, preferably, with ribs upon its upper face, since the can to be soldered is to travel on this surface, and the ribs will form a support without causing much friction. A cover 70 is, preferably, likewise secured to the solder receptacle, being attached at its outer or forward edge, and it extends within a predetermined distance of the bearing 69, and preferably is provided with a downwardly-extending and rearwardly-inclined member 70ʰ. On the top of the rear edge of the cover 70 a guard-plate 71 is firmly secured, and this plate is adapted to have bearing against the can to prevent it from slipping off of the chuck while it is taking the solder.

Any means may be employed for heating the solder. In the drawings burners 74 are shown, connected with two pipes 72 and 73, one of which may be used for conducting gas or other heating agent and the other air to promote combustion. The burner 74 is of any desired character, and the heat may be conducted up within the furnace through suitable chimneys 75; or coal-oil burners may be used or coal and wood may be employed as heating factors, if desired.

Near the forward end of the machine, at the front, a platform E is located and supported, said platform comprising a horizontal member and a vertical outer member. The platform is sustained, preferably, by standards 76, as shown in Fig. 1, secured to it and attached to the forward portion of the base of the machine; but the connection between the standards 76 and the platform is a pivotal and adjustable one, the said adjustment being brought about by forming brackets 77 on the outer or vertical members of the box and pivoting said bearings in longitudinal openings in the standards, as shown in Figs. 1 and 2.

The vertical member of the platform near its forward end is reinforced or strengthened by a horizontal web 78, and this web is adapted to support a sleeve 79, which extends from the forward portion of the platform over the track 24 at the top of the front plate 20 of the main frame. Within this sleeve a shaft 80 is journaled, and the said shaft is controlled by a spring 81, which is secured, preferably, to the sleeve 79 and to an offset on the hub 83 of an arm 84, which extends downward from the shaft in front of the platform, the hub being attached to the shaft. At the opposite or rear end of the shaft an arm 82 is secured, and this arm normally extends downward with a rearward inclination and is adapted to rest upon the aforesaid track 24 to be raised by the forward roller 46 of the chuck-shaft, as shown in Figs. 3 and 6.

The outer crank-arm 84 of the shaft 80 is provided with a slot 85 in its lower end. The platform E is narrowed gradually at a point somewhat at the rear of the shaft 80, as shown in Fig. 6, and said inclined portion is designated in said figure as E'.

Between the inclined section of the platform and the shaft 80 a hopper F is located, being adapted to receive and hold a number of cans, and the cans are fed one after the other by gravity onto the horizontal member of the platform E, the hopper being usually supported by an upright 86, which may be adjustably attached thereto, and said upright is also secured to the base A at a suitable point, as illustrated in Fig. 1.

In the straight portion of the vertical member of the platform at the rear of the shaft 80 an opening 87 is made, and this opening is normally closed by a door 88, pivoted close to the sleeve 79, and the said door is provided with a stud projected outward horizontally from its pivot-point, and the said stud is made to pass through the opening 85 in the outer crank-arm 84, as shown in Fig. 7. When the door 88 closes the opening 87, the inner crank-arm 82 will rest upon the aforesaid track 24. The rear contracted end of the platform E is opposite the lower and rearward trip-stud 30, adapted, as heretofore mentioned, to lock the clutch on the can. The can having been released from the clutch at the forward trip-stud 28, the clutch will continue with its clamps drawn in until it reaches that portion of the platform at which the lower end of the hopper is placed. The lowermost can in the hopper will rest upon the platform, and its open end will face the clutch. As the clutch approaches the can, as shown in Fig. 6, just at the moment that the clutch will be in position to enter the can the inner crank-arm 82 will be forced upward on the front roller-bearing 46 on the chuck-shaft 39, and the upward movement of this inner crank-arm will so rock the shaft 80 as to throw the forward crank-arm rearward, and in so doing the said outer crank-arm will force the door 88 inward, and said door will be carried against the can and will force said can to the inclined position shown in Fig. 6 and hold it in that position until the chuck has entered it and engaged with its rear end surface. As the chuck passes rearward the door is maintained in the position shown in the said Fig. 6 until the arm 82 has been freed from the bearing 46 on the clutch-shaft. At that time the rear end of the can will have struck the inclined vertical surface E' of the platform, and it will act to keep the can on the clutch and force it to an even engagement therewith, and before the can is released from guided contact with the platform the rear and lower stud will have acted on the clutch to force downward or expand its clamps or permit the springs connected therewith to so act.

The action of the machine is substantially as follows: Power is transmitted through the belt 35 to the carrying-belt 38, and the chuck-shafts connected with the carrying-belt by the links 40 will be free to move vertically, as well as to revolve. The chucks or holders C are drawn by the chain in the direction of the arrow shown in Fig. 1. The chuck-shafts 39 are prevented from revolving as long as their "guide-blocks" or "cams" 45, as they may be termed, remain between the guide-rails 25 and 26. As the cam-heads of the chucks reach the upper trip-stud 28 said heads will be turned by said stud in a direction to release the cans which have been soldered from the chucks. The released cans as they drop from the chucks will be made to slide down an inclined chute upon a cooling-belt, neither of which is shown, as they are of ordinary construction. The empty chucks are next carried to the hopper and receive at the table E each another can supplied thereto by the feed mechanism heretofore described in construction and operation. The chucks with the cans in position thereon travel to the rear of the auxiliary frame B² and down the rear inclined channel B' and between the rear extremities of the guide-rails 25 and 26, the cams or guide-blocks traveling between the rails and the roller-bearing of the cams being within said channel. As soon as the cam 45 of the lowermost chuck leaves the supporting guide-rail 25 the pinion 44 upon the shaft of that chuck will engage the rack 31, whereupon the chuck and its shaft instantly commence to revolve and move ahead through the curved or undulating channel B, as shown in Fig. 3, the can being at that time introduced into and turned in the flux-bath. The channel B is of such shape that it causes the lower edge of the can to roll in a straight line. The can receives one complete revolution while going through the flux-pan, and it is then raised sufficiently to clear the partition between the flux and solder pan by reason of the shallow portion $b$ in the channel B (shown in Fig. 1) and corresponding shallow section $b'$ in the rack. The can has about three revolutions in the solder, and as the last revolution is finished the cam 45 will engage with the lower end of the upper guide-rail 25 at the front end of the machine, the pinion 44 at the same time instantly leaving the rack. The chuck and its shaft will then slide upward without revolving, and when the upper trip-stud 28 is reached the can is released and the chuck is ready to receive another can.

There are only a few chucks illustrated in Fig. 1, but a complete set comprises about twenty chucks, and the capacity of such machine will be about twenty thousand cans per day of ten hours, requiring two attendants only, one to feed the cans to the hopper and the other one to attend to the running of the machine and to keep the solder at proper temperature and height, as also the flux.

The machine solders both empty and filled cans, an outside clamping-chuck being substituted for an inside clamping one. The machine can be built any length to give the can more revolutions in the flux and more in the solder, if required. The machine may be adapted for any odd or irregular-shaped can, as, for example, any form of an oval, elliptical, or square can, by making the curved or undulating channel B the proper shape. For oval cans the rack must have the same curve as the channel B, since the round pinions give a perfectly even speed to the revolving chucks. Straight racks might be used with an oval pinion, but the speed of the revolving chuck would be unequal, which would be a detriment to good work. The curved slot and curved rack are therefore preferred.

A different shape of can necessitates a different shape of channel B and rack. The cans may be large or small, square, polygonal, or oblong or may approximate such shapes.

In Figs. 8, 9, 11, and 12 I have illustrated a holder or chuck for clamping and carrying the filled can to the soldering-bath. This form of chuck differs from that shown in Figs. 4, 5, and 10, which is adapted to clamp an empty can, in that the clamps $57^a$, adapted for use with a filled can, clamp the outside of the said can instead of the inside. Two of the said clamps $57^a$ are preferably employed, located one at each end of the plate $52^a$, and a hub $53^a$ is formed upon the central portion of the inner face of this plate, and the shanks $58^a$ of the clamps when in their open position, as shown in Fig. 8, extend beyond the ends of the plate. The shank $58^a$ of each clamp is secured to a slide $55^a$, and at each end of the plate $52^a$ a slot 95 is made provided at each side with a tongue $95^a$. The shanks $58^a$ of the clamps have sliding movement in the said slots, receiving the tongues $95^a$, and each slide $55^a$ has movement between ribs or flanges 96, formed upon the inner face of the plate at each side of the slots 95, as shown in Fig. 8. Each slide $55^a$ is provided at its outer end with a flange 90 at an angle to the slide, and each flange has a pin 91 horizontally formed upon its inner face, and each pin receives a spring 92. The inner ends of the springs fit over horizontal pins 93, forming portions of blocks 94, secured to the inner face of the plate $52^a$, straddling the slides $55^a$ near their inner ends. These springs act to normally force the clamps $57^a$ outward, since the action of the clamps in the outside holder or chuck is just the reverse of the action of the inside holder or chuck, the clamps moving outward to release the cans and inward to clamp the same. A pin $56^a$ is located at the inner end of each slide $55^a$, and said pins are received upon cam-surfaces 97, the said surfaces being the side walls of a depression or recess 98, made in the outer or front face of a cam-head $c^2$, provided for this form of chuck, the said cam-surfaces having but two recesses therein for the pins of the slides, since but two slides are employed; otherwise the cam-head $c^2$ is of the same construction as the head $c'$ used upon the chuck adapted especially for the reception of empty cans.

Having thus described my invention, I claim as new and desire to secure by Letters Patent—

1. In a can-soldering machine, an undulating rack, a guide-channel near the rack shaped correspondingly to the rack, a can-holder the support of which moves in the said channel, and a pinion carried by the support, being adapted for engagement with the aforesaid rack, and a carrier for the shaft, as and for the purpose specified.

2. In a can-soldering machine, a solder or flux bath, an undulating rack, a correspondingly-shaped guide-channel located above the said rack, a shaft, a carrier for the same, the travel of the shaft being regulated by the shape of the said channel, a pinion secured to the shaft and engaging with the said rack, whereby the shaft when drawn through the guide-channel will be rotated by the engagement of the pinion with the said rack, and a chuck adapted to receive a can and arranged to pass over the said solder-bath, substantially as described.

3. In a can-soldering machine, a frame having a serpentine guide-channel therein, guide-rails attached to the frame and located above the said channel, the ends of the guide-rails being curved to meet the said channel, an undulating rack located beneath the undulating channel, conforming thereto, a shaft held to travel in the said guide-channel, adapted to receive a can-holder, a pinion carried by the shaft and engaging with the said rack, a carrier with which the shaft is connected, and a cam carried by the shaft and adapted for engagement with the guide-rails, whereby when such contact is obtained the shaft will be held stationary, as and for the purpose specified.

4. In a can-soldering machine, a can-holding shaft, an undulating guide-channel for the same, guide-rails located above the undulating channel, being parallel for a given distance in their length, the ends of the said rails being curved to meet the extremities of the said undulating channel and conform thereto, a rack terminating inside of the lower point of the guide-rails, a pinion secured to the said shaft, adapted for engagement with the said rack, and a cam secured to the shaft, shaped to pass between the guide-rails, the said cam serving to prevent the rotation of the shaft while between the said guide-rails, as and for the purpose specified.

5. In a can-soldering machine, a can-holding shaft, an undulating guide for the same, a correspondingly-shaped rack adjacent to the guide, like curved sections being in registry with the said rack, an endless conveyer, a link connection between the conveyer and the shaft, and a pinion carried by the shaft and adapted for engagement with the aforesaid rack, as and for the purpose specified.

6. In a can-soldering machine, a frame provided with a guide-channel, a rack adjacent to said channel, a can-holding shaft extending through the said channel and provided with a bearing fitted to engage with the opposite walls of the channel, a mechanism substantially as described, for drawing the shaft through the channel, a pinion secured upon the shaft and engaging with the rack, a cam-head attached to the said shaft, a chuck provided with spring-controlled jaws and operated from the said cam-head, and trips adapted to operate the said cam-head during its travel in the machine, as and for the purpose specified.

7. In a can-soldering machine, the combination with a frame having a guide-channel thereon, a stationary rack, an endless carrying-belt and means for driving the same, of guide-rails leading to and from the guide-channel, can-holding shafts having bearings thereon fitted to and adapted to slide in said channel, cams secured to the shafts, adapted to travel in engagement with the guide-rails, and pinions secured to the shafts and adapted for engagement with the rack, substantially as and for the purpose specified.

8. In a can-soldering machine, the combination with a frame having an undulating channel thereon, and inclined end channels communicating with the undulating channel, and guide-rails independent of the undulating channel but partially surrounding the inclined channels, of can-holding shafts having fixed bearings, adapted to travel in said channels, cams secured to the shafts, adapted to engage with the guide-rails, an undulating rack located adjacent to the undulating channels the undulations of both corresponding, a carrier for the shafts, and pinions secured upon the shafts, engaging with said rack, substantially as shown and described.

9. In a can-soldering machine, the combination with a frame having a guide-channel thereon, guide-rails leading to and from said channel, trip devices located one near each guide-rail and a rack adjacent to said channel, of an endless carrier, shafts attached to the carrier, extending through and guided by said channel, cams secured upon the shaft, adapted for engagement with the guide-rails, pinions carried by the shafts and engaging with said rack, and chucks carried by the shafts, being opened or closed by the said trip devices, substantially as described.

10. In a can-soldering machine, a pivoted auxiliary frame, an adjusting device whereby the auxiliary frame is given an inclination, a carrier located in the frame, shafts pivotally connected with the said carrier, being given lateral movement thereby, a rack-and-pinion mechanism for rotating the said shaft, chucks adapted to receive cans and carried by the said shafts, the said chucks being provided with spring-controlled clamps, a cam-head arranged to open and close the said clamps, trip devices attached to the frame, and arms projected from the said cam-head, adapted to be engaged by the said trip devices for opening and closing the chucks, substantially as described.

11. In a can-soldering machine, the combination, with a frame provided with an undulating guide-channel, devices for adjusting the frame to an inclined position, an endless carrier, shafts connected with the said carrier, having lateral movement directed by the said guide-channel, and an undulating rack located beneath and corresponding to the undulating guide-channel, of a solder or flux bath provided with a track extending over the contents of the bath, chucks secured to the said shaft and adapted to receive cans, the latter being adapted to travel upon the track of the bath, a gage for holding the cans upon the chucks, pinions attached to the said shafts and engaging with the said racks, guide-rails located above the undulating channel, the ends of the rails extending downward to meet the channels and terminating at the ends of the rack, and cams secured to the said shafts, adapted to travel between and engage with the guide-rails, substantially as shown and described.

12. In a can-soldering machine, a chuck, the same consisting of a plate and a cam-head having movement on the plate, spring-controlled clamps carried by the said plate, and a slide operating said clamps and operated from said cam-head, as and for the purpose specified.

13. In a can-soldering machine, a chuck or holder for cans consisting of a plate, spring-controlled clamps movably mounted on the said plate, slides adapted to operate the said clamps and connected therewith, pins projected from the slides, and a cam-head provided with a cam-race adapted to receive the pins of the slides, the said race having recesses therein in number corresponding to the number of the slides, as and for the purpose specified.

14. In a can-soldering machine, a chuck or can-holder consisting of a plate of substantially-corresponding contour to that of the can it is adapted to carry, spring-controlled clamps located at the margins of the plate, shanks connected with the said clamps, slides connected with said shanks, a cam-head mounted to turn on the plate and provided with a cam-race having recesses therein, pins projected from the slides, entering the said race, and trip-arms extending from the exterior of the said cam-head, as and for the purpose set forth.

15. In a can-soldering machine, a flanged table contracted at its delivery end and having the flange at said end inclined, a hopper arranged to feed cans to the table, a door hinged at the table below the hopper and adapted to have movement over the table, a chuck, a carrier for the same, a spring-controlled shaft provided with an arm connected with the door, and a second arm adapted to rock the said shaft and adapted to be lifted by the chuck-carrier, a support for the chuck in its passage beneath the said second arm, a conveyer for the chuck-carrier, and a trip device adapted to engage with the chuck and close the same upon the can at the contracted end of the said table, as and for the purpose set forth.

16. In a can-soldering machine, the combination with a frame, of an undulatory guide, a correspondingly-formed rack, a belt, and a chuck connected with the belt and capable of moving independently of the belt, the chuck being controlled by the guide and operated by the rack, substantially as described.

17. In a can-soldering machine, the combination with a frame, of a belt, a shaft having loose connection with the belt and capable of moving independently of the belt, a chuck carried by the shaft, an undulatory guide controlling the shaft, and an undulatory rack with which the shaft coöperates, substantially as described.

18. In a can-soldering machine, the combination with a main frame, of an auxiliary frame adjustably carried on the main frame, an endless oval-shaped guide supported on the auxiliary frame, an undulatory rack adjacent to one run of the guide, a belt, a chuck connected with the belt, and means for operating the chuck by engagement with the rack, substantially as described.

19. In a can-soldering machine, the combination with a frame, of a guide, a chuck controlled by the guide, means for moving the chuck, a shaft having two crank-arms, one of said crank-arms being engaged by a part moving with the chuck, and a pivotally-mounted door for controlling the feed of the cans, said door having sliding connection with and being actuated by the remaining arm of the shaft, substantially as described.

20. In a can-soldering machine, the combination with a frame, of a guide, a belt, a shaft moving in the guide and connected to the belt, a chuck, a rock-shaft, an arm carried by the rock-shaft and adapted to be engaged by the shaft which carries the chuck, a second arm carried by the rock-shaft, and a pivotally-mounted door slidably connected with the second arm, said door controlling the feed of the cans, substantially as described.

21. In a can-soldering machine, the combination with a frame, of a belt, a can-holding chuck connected with and moved by the belt, a table having a portion inclined in relation to the line of movement of the chuck, and means for feeding the cans so that they will be engaged with the inclined portion of the frame, said inclined portion being capable of moving the cans laterally and into engagement with the chuck, substantially as described.

22. In a soldering-machine, the combination with a frame, of an undulatory guide, a correspondingly-undulating rack, a belt, a shaft connected with the belt and wabbled by the guide, a gear-wheel fixed to the shaft and meshing with the rack, and a chuck carried by the shaft, substantially as described.

23. In a can-soldering machine, the combination with a frame having a detent, of a chuck and means for moving the chuck into engagement with the detent, the chuck comprising two movable clamps, and also comprising a cam-head connected with the clamps and adapted to be engaged by the detent to operate the clamps, substantially as described.

24. In a can-soldering machine, the combination with a frame having a detent, of a chuck and means for moving the chuck into engagement with the detent, the chuck consisting of two clamps, a cam-head having eccentric and sliding connection with the clamps, and a pin projecting from the head and capable of being moved into engagement with the detent, substantially as described.

NELSON TROYER.

Witnesses:
S. N. GORDON,
E. G. ROGERS.